Figure 3:
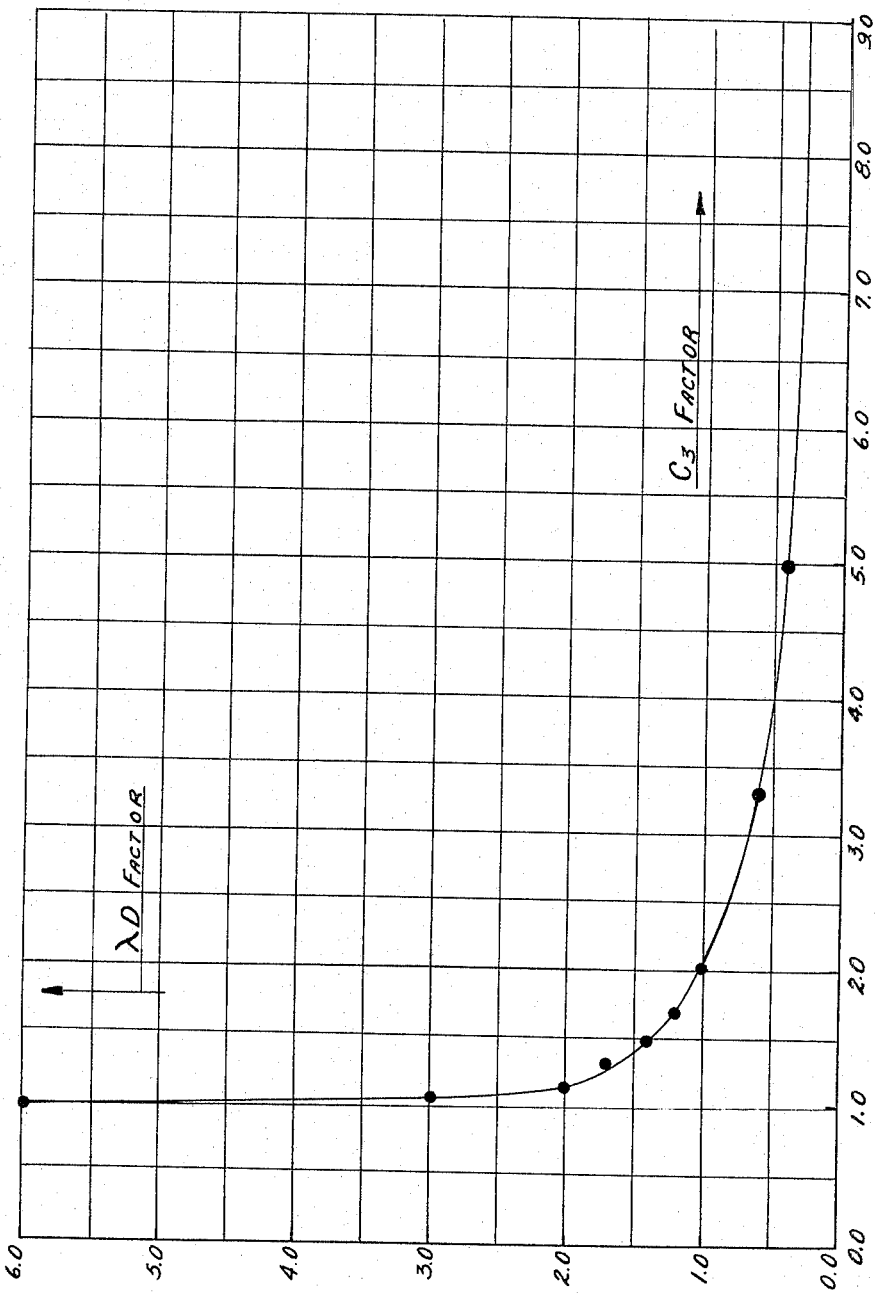

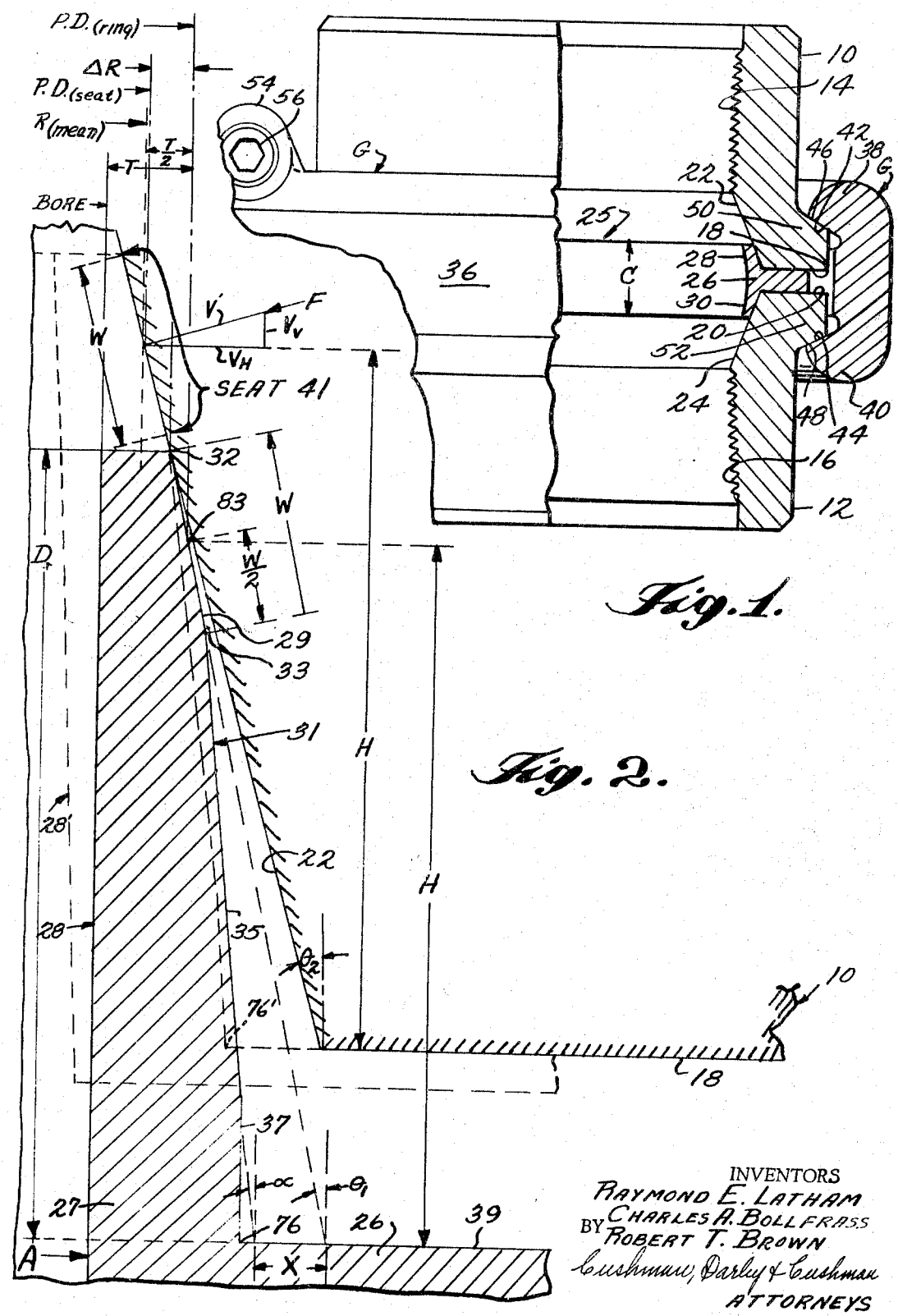

United States Patent Office 3,325,176
Patented June 13, 1967

3,325,176
SEAL RINGS
Raymond E. Latham, Charles A. Bolifrass, and Robert T. Brown, Houston, Tex., assignors to Gray Tool Company, Houston, Tex., a corporation of Texas
Filed Oct. 14, 1963, Ser. No. 315,962
1 Claim. (Cl. 277—225)

This invention relates to couplings, and more particularly to improvements in couplings, especially the sealing rings thereof, of the type disclosed and claimed in the Watts and Hill Patents 2,766,829, 2,766,998, and 2,766,999, all issued Oct. 16, 1956, and assigned to the assignee of the present application.

The above patents disclose a coupling including two parts to be connected together in sealed relation, for example oil well parts which may be subjected to excessively high fluid pressures. The parts may be the casing or tubing sections, the control equipment parts utilized in the drilling procedure, or the Christmas tree parts utilized in the well completion procedure, all as referred to in these patents. The above-mentioned parts of the coupling have end surfaces adapted to be presented toward one another and a sealing ring of metal, for example hard metal, or the like is interposed between the end surfaces or the parts to effect a fluid tight seal. Each part is provided with an outwardly tapering annular seating surface adjacent the end surface and the sealing ring comprises a flange portion having oppositely disposed flexible lips and a centrally disposed rib portion. The lips are provided with annular seating surfaces which taper outwardly toward the rib portion at an acute angle with respect to the longitudinal axis of the sealing ring. The coupling is completed by the provision of suitable means for drawing the two parts toward one another into sealing engagement with the ring therebetween.

During the movement of the parts toward one another, the rib portion serves to engage the end surfaces of the parts to limit the amount of movement of the parts together. The sealing surfaces on the lips of the sealing ring are arranged to engage and to be deflected by and sealed with the sealing surfaces of the parts. The deflection of the lip surfaces is within the elastic limit of the metal or other material utilized to form the sealing ring and the deflection serves to provide a stored energy which acts to increase the effectiveness of the seal.

In the above arrangement as disclosed in the Watts and Hill patents, the sealing surfaces of the sealing ring are straight in profile and are normally disposed at an angle with respect to the straight profile sealing surfaces of the cooperating coupling parts. Consequently, when these sealing surfaces are brought into engagement there is a constant angular deflection of the lip sealing surfaces, such deflection being about an axis which passes through the juncture between the sealing surface and the adjacent surface of the rib portion.

The present invention pertains mainly to a novel type sealing ring which will cause a predetermined sealing pressure on the seat of the part or parts to which the ring is coupled. The only ring area in contact with the seat is a predetermined, finite, circumferential portion on the face at the outer end of at least one annular flange extending from the cylindrical rib of the ring, the remainer of the flange face being relieved so as to give a contact area which will provide a predetermined load or contacting pressure uniformly around the flange. By this invention, all seal rings, regardless of their diameters, may be made dimensionally proportional with corresponding ring geometries necessary to yield a constant contact pressure.

It is therefore an object of this invention to provide a sealing ring which has an annular flange capable of essentially elastic movement while providing a finite surface area for a predetermined contact pressure with a seat, using materials of various yield strengths.

It is also an object of this invention to provide sealing rings with flanges which will change elastically in diameter at their tip during seating based on the yield strength and elasticity of the ring material, the remaining dimensions of the ring being determined therefrom, to provide rings of any desired diameter which will yield constant contact pressures relative to their seats.

Other objects and advantages of this invention will become apparent upon reading the appended claims and the following detailed description in conjunction with the drawings, in which FIGURE 1 is an elevational view, partly broken away and partly in vertical section, of a coupling employing the principles of the present invention;

FIGURE 2 is a cross-sectional view of a portion of a sealing ring made in accordance with this invention in conjunction with its seat; and FIGURE 3 comprises a curve plot of $\lambda D$ and $C_3$ factors.

It is contemplated by this invention that metal seal rings of any desired diameter may be made from material having definite values of Poisson's ratio and Young's modulus of elasticity. For example, the formulae developed herein are especially useful for Poisson's ratios of 0.24 to 0.34 and elastic moduli of 27 to $31 \times 10^6$ p.s.i., to provide a minimum seating stress of 26 k.s.i. between the sealing members through the substantially elastic, angular rotation of the lips of the rings and, hence, the inward radial displacement of the lip ends.

Referring now more particularly to FIGURES 1 and 2, there is shown therein a preferred embodiment of a coupling embodying the principles of the present invention. As shown, the coupling includes two conduit parts 10 and 12, each having aligned inside bores 14 and 16, respectively. It will be understood that while the parts 10 and 12 are shown as being of the type adapted to convey fluid under pressure, such parts may be of the type which serve to merely hold fluid under pressure such as container parts or receptacle parts. In such instances one of the parts may simply be a closure member while the other part has a fluid pressure opening therein which is closed at the end opposite from the closure end.

In the embodiment shown, the parts are provided with end surfaces 18 and 20, respectively, and have inner sealing surfaces or seats 22 and 24, which taper outwardly to the respectively adjacent end surfaces 18 and 20 at a predetermined constant seating angle which is acute relative to the axis of bores 14 and 16 and preferably in the range 15°–20°, for example. As shown, these sealing seats are provided in the terminal portion of the walls defining the bores 14 and 16.

The coupling of the present invention as shown in FIGURES 1 and 2 embodies a novel sealing ring 25, arranged to be interposed between the parts 10 and 12 to provide a sealing arrangement therebetween when the end surfaces 18 and 20 of the parts presented toward each other are drawn toward one another by any suitable means, such as a clamping assembly, generally indicated by G in FIGURE 1. The sealing ring 25 is preferably made of a suitable metal and has a cylindrical rib 26 with an inner bore A (FIGURE 2) and an outer diameter which extends beyond the outer diameter of the base 27 of the oppositely disposed flexible flanges or lips 28 and 30, which are formed integrally concentric with the cylinder 26. The inner diameter of the lips 28 and 30, when they are in an unflexed or normal condition as shown by solid lines in FIGURE 2, for exemplary purposes is shown equal to the inner diameter A of the cylindrical rib 26, and as can be appreciated from FIGURE 1 and the dotted line configuration 28' in FIGURE 2, the lips bend or flex inwardly when fully seated.

As previously indicated, the seating surfaces 22 and 24 flare outwardly toward their respective end surfaces 18 and 20 at an acuate angle relative to the axis of the coupling parts 10 and 12. On the other hand, flanges 28 and 30 have outer faces which, when unseated, do not conform to the angulation of the respective seats 22 and 24, the difference being between the normal face angle $\theta_1$ and the seat angle $\theta_2$. Taking as an example, the upper flange 28, which is shown in detail in FIGURE 2, it being understood that the lower flange 30 is similarly manufactured with respect to its seat, it will be noted that the uppermost portion 29 of the outer face 31 of flange 28 extends at an angle $\theta_1$, relative to the axis of the ring, for a distance W downward from the very tip 32 of face 31. At point 33, the flange face 31 is relieved, for example at the constant angle $\alpha$ for the surface 35 and vertically for the surface 37. When the outer horizontal surface 39 of cylinder 26 is forced into contact with the end surface 18, the annular sealing portion 29 of the flange face, along with the flange as a whole, rotates inwardly so that surface 29 becomes flush and fully in sealing contact with the seat sealing surface 22, at the indicated seat position 41. The dotted outline 28' otherwise indicates how the flange and ribs are disposed when fully seated.

As is apparent from FIGURE 2, the angle $\theta_1$ at which the sealing portion 29 downwardly and outwardly extends normally, is less than the seat angle $\theta_2$. As above indicated, angle $\theta_2$ is preferably in the range of between 15° and 20°, though limitation thereto is not intended. In any event, angle $\theta_2$ is acute and angle $\theta_1$ is less, by one degree or so. The differences in angles $\theta_1$ and $\alpha$ is such that, for example, the distance X projected onto surface 39 is in the order of 0.005 to 0.010 inch, meaning that angle $\alpha$ is normally in the range 9°–16°. No limitation is intended to such dimensions. In any event, there is always a small clearance between the seating surface 22 and the flange face 31 everywhere except for the sealing portion 29 when the ring is fully seated. Accordingly, there is sealing pressure only for the predetermined distance W around the annular surface 29, thereby causing the desired predetermined sealing pressure on the seat, since distance W is predetermined in accordance with the desired or predetermined load or contact pressure.

Sealing ring 25 is preferably made of elastic steel, at least the lip portions are sufficiently elastic so that they may be bent inwardly within the elastic limit of the metal from the position illustrated in solid lines in FIGURE 2 to that shown in dotted lines, when the exterior clamp G draws the parts being joined toward one another.

As shown, the clamping assembly G comprises two or more segmental clamping members 36 each having a pair of segmental annular flanges 38 and 40 extending radially inwardly from the sides thereof. The annular flanges are provided with wedging surfaces 42 and 44 which converge inwardly with respect to each other. The wedging surfaces are arranged to engage cooperating wedging surfaces 46 and 48 formed on radially outwardly extending annular flanges 50 and 52 provided on the parts 10 and 12, respectively, adjacent their end surfaces 18 and 20. Extending longitudinally outwardly from each end of each segmental clamp member is a pair of oppositely disposed apertured lugs 54 arranged to receive tightening bolt assemblies 56. The lugs 54 are disposed within the plane of the outer periphery of the segmental clamping members. It will be seen that when the bolt assemblies 56 are tightened the segmental clamping members will be moved radially inwardly with respect to each other and due to the engagement of the wedging surfaces, the parts 10 and 12 will be drawn toward one another.

While it is preferred that the sealing ring be made of an elastic hard metal such as steel, it can be made of softer metals such as brass or even of suitable plastics such as Bakelite. However, the elastic steel is preferred, so that when the lips of the ring are bent inwardly within the elastic limit of the metal, they will return to the normal solid-line position of FIGURE 2 when the force is removed so that a particular sealing ring may be re-used.

It has been discovered that the radial displacement inwardly of the flanges which is allowable depends upon the yield strength S of the ring material and its modulus of elasticity E, particularly the ratio S/E therebetween. More particularly, the inward radial displacement $\Delta R$ may be given in terms of the unseated ring pitch diameter PD (at point 83) of the lip sealing surface 29, by multiplying that diameter by the ratio $S/E$, which may be in the range 0.001–0.003 for example. It has also been discovered that the radial displacement $\Delta R$ is approximately as follows:

$$\Delta R = \frac{0.891 V_H (1-v^2)(A+T)\sqrt{AT+T^2}}{ET^2 C_3 [(1-v^2)]^{3/4}} \quad (1)$$

In that equation $V_H$ is the uniform radial shear or predetermined load at point 83 in units of weight per linear inch of circumference of seat diameter PD, from which the contact pressure K in p.s.i. can be found by dividing $V_H$ by the lip sealing length W and multiplying the result by the cosine of $\theta_2$, T is the radial width of the flange at its pitch diameter, $v$ is Poisson's ratio, and $C_3$ is the function of a geometrical factor as indicated in FIGURE 3. In the drawing, F is the total conatct loads (lbs., e.g.), i.e., all the contact load on the full annular area of height W of sealing surface 29; V is the linear force perpendicular to W (lbs. per inch of circumference of seat diameter PD) and may be the quotient of F divided by $\pi$ times $PD_{(ring)}$ or the product of WK or the product of $V_H \cos \theta_2$; and length W is therefore determined by dividing the total load F by the product of the contact pressure or seating stress K and the unseated circumference of sealing portion 29 at point 83, i.e., $\pi$ times $PD_{(ring)}$. Equation 1 is based on the relationship $$\Delta R = \frac{V_H}{2P(\lambda)^3 C_3} \quad (2)$$

wherein, with the mean ring radius $R_M$ equal to $.5(A+T)$, $$P = \frac{ET^3}{12(1-v^2)} \quad (3)$$

and $$\lambda^3 = \left[ 4\sqrt{\frac{3(1-v^2)}{R_M^2 T^2}} \right]^3 = \frac{6.73[(1-v^2)]^{3/4}}{T(A+T)\sqrt{AT+T^2}} \quad (4)$$

The length W of lip sealing portion 29 may vary within the range of approximately ⅛ to ½ of the axial length D of the ring, D being as shown in FIGURE 2. A minimum of approximately ⅛ is required for practical machine tolerances, while the approximate maximum ½ is required by the abnormally large $V_H$ value when certain limiting values are used for the contact pressure K.

On the other hand, the full axial length C of the ring may be as desired, and may take a linear ratio with respect to the ring bore A, including bores up through and over 100 inches for example, as indicated by the equation $$C = \frac{A}{20.8} + 0.55 \quad (5)$$

One especially useful value of the length W of the sealing portion 29, in terms of the bore A, is as follows:

$$W = .0056A + 0.075 \quad (6)$$

This equation shows that W may be varied beyond the limits above given relative to D/W.

The radial thickness T of a lip or flange at its pitch diameter point 83 depends upon the ratio $S/E$, and the ring bore A. For example, for $S/E$ ratios of 0.001, 0.002, and 0.003, the respective thicknesses $T_1$, $T_2$, $T_3$ may be in accordance with the following equations:

$$T_1 = .029A + 0.024 \quad (7)$$
$$T_2 = .01875A + 0.125 \quad (8)$$
$$T_3 = .0139A + 0.11 \quad (9)$$

With the thickness T known, the ring diameter PD can be determined since the bore is also known:

$$PD_{(ring)} + 2T \quad (10)$$

and the pitch diameter of the seat 41 is $$PD_{(seat)} = PD_{(ring)} - 2(\Delta R) \quad (11)$$

Equation 11 gives the seat diameter at a distance H from the end surface 18, which is equivalent to the distance from the ring outer cylindrical surface 39 to the mid point 83 of the lip seal 29. Since the pitch diameter of the seat is based, in accordance with Equation 11, on the radial displacement $\Delta R$ which actually takes place at the diameter PD of the lip 29, the difference in the radial displacement thereof and at the tip of the lip face 29 is insignificant.

Though not shown, the tip point 32 of the lip may be extended slightly so that it is beyond the outer extent of seal W and rounded with a radius R for example. Under such circumstances, $$D - H = R(1 - \sin \theta_1) + (W/2) \cos \theta_1 \quad (12)$$

In making a sealing ring in accordance with the invention it is also necessary to determine the outer diameter of cylinder 26 and the thickness thereof. Generally speaking, the radial extent of surface 39 of the cylindrical rib 26 is just sufficient to provide the maximum bearing area required with a minimum bending moment arm. The rib thickness on the other hand, must be great enough to resist compressive failure (constant with a limiting rib diameter) and at the same time as small as possible to avoid exposing a large area to pressure in order to minimize shear stresses and principally to minimize movement at the base of the lips. In particular, the thickness of rib 26 may vary from ⅛ of the axial ring length C to ⅞ thereof, preference being given to 0.2(C).

With a sealing ring made in accordance with this invention, a contact sealing pressure K between the sealing lips and seats, preferably of at least 26,000 p.s.i. for example, is available through the substantially elastic angular rotation of the ring lip and hence the inwardly radial displacement of the lip end. When the ring is seated, the cylindrical rib 26 may be slightly contracted in diameter, especially as the diameter of the ring is large, such as up to 15 feet. This may be appreciated from FIGURE 2, by noting the inward (leftward) displacement of the juncture 76 of the flange 28 and rib 26, as shown at juncture 76' in the dotted line (seated) version.

When the bolts of the clamping assembly G are hand-tightened, initial contact is made at point 32 on each flange face, i.e., at the outer extremities of the sealing portions of the ring, against the sealing surfaces of the parts being connected. As previously indicated, the angle $\theta_1$ for lip sealing surface is less than the sealing angle $\theta_2$ for example by 1°, so when the two parts 10 and 12 in FIGURE 1 are drawn toward one another by the clamping assembly G, the lip points 32, all the way around each of the flanges 28 and 30, will be deflected inwardly by engagement with the corresponding straight sealing surfaces 22 and 24 of the parts 10 and 12, up to the position where the end surfaces 18 and 20 are brought to a stop when they engage the flat outer surfaces of the cylindrical rib 26. At this time, the pairs of engaging sealing surfaces on the lips of the sealing ring and on the ends of the parts 10 and 12 are parallel with and flush against one another as shown in dotted lines in FIGURE 2. As the seal is completed the lips of the sealing ring are thus flexed inwardly, the angular deflection of the lips being greater at their outer ends 32. Thus, at the circumferential points 33, the lip sealing portions 29 are deflected less, and less yet the relieved flange face surfaces 35 and 37 which inwardly rotate with the flange during seating by bending at the base juncture 76.

Thus, when the exterior clamp is tightened from its hand tight position described above to the position shown in FIGURE 1, the portions 29 of the lips are deflected inwardly. Because this deflection is within the elastic limit of the material from which the ring is made, energy is stored in the lips and they place themselves tightly against the sealing surfaces 22 and 24 of the respective seats. When the clamping is fully set up, the sealing surfaces 29 are tight and sealingly engage with the corresponding sealing surfaces on the conduit parts 10 and 12. Thereafter, when the union is subjected to pressure, this pressure is exerted outwardly against the inner face of the flange of the sealing ring to make the sealing action more effective. The relationship above described relative to the D/W ratio provides a multiplier such that any increase in internal pressure acting over the length D will cause a proportionally higher increase in the contact pressure. It is to be understood that only a moderate force is required to be exerted on the nuts of the clamping assembly, in order to deflect the sealing lips 29 inwardly to the position illustrated by dotted lines in FIGURE 2. Yet, the union is a completely effective one because the pressure subject area is substantially reduced and the pressure acts against the flange of the sealing ring, to increase effectiveness of the seal thus formed. With the construction as illustrated, the attendant will always know when he has properly tightened the nut of the clamping assembly for it is only necessary that he tighten them until the tightening action is stopped, by the contact of the end surface 18 against the rib surface 39 of the sealing ring, as shown in FIGURE 1. Furthermore, it is not possible for the attendant to set up on the bolts of the clamping assembly to a point where the sealing ring would be crushed, for the cylindrical rib 26 provides a definite stop against excessive make up and subsequent operating loads.

It was above mentioned that the cylindrical rib may diametrically contract during the setting up of the ring, but it is to be understood that such contraction, if any, is present only for larger diameter rings with the main movement of the sealing ring being the inward bending of the lips thereof as described.

When the union is tightened, a substantially unitary structure results, the strength of the metal of the ends of the parts serving to back up the sealing ring whereby extremely high pressures may be withstood. The rib 26 of the sealing ring provides increased strength, in order to resist any bursting tendency at the union caused by high fluid pressure which is being handled.

Although the sealing ring has been illustrated and above described as being of symmetrical design, i.e., with annular flanges 28 and 30 extending in opposite directions from the cylindrical unit, it is to be understood that it is within the contemplation of this invention that the ring has only one such flange or lip, with or without extension of rib 26 outwardly beyond the maximum lip diameter. Such single lip rings may be, for example, of the general type described and claimed in the co-pending application of John D. Watts, Ser. No. 62,008, filed Oct. 11, 1960, which issued Sept. 29, 1964, as Patent No. 3,150,889.

With the invention as described above and defined in claims below, it is possible to determine, with considerable accuracy, the actual contact sealing pressure for any given size ring, or to make a ring to provide a required contact sealing pressure on a given diameter. Heretofore sealing rings of the type described and claimed in the aforesaid Watts and Hill patents were generally made with trial and error methods of design. However, with the larger ring diameters that are now required (e.g., up to 15 feet) it becomes an unfeasible economical risk to proceed on a trial and error basis, and even so, the number of efforts required to so make such rings could mean a virtual impossibility of obtaining successful designs. With this invention, any diameter ring, or any desired contact sealing pressure, may be provided for on a standard basis, thereby eliminating the necessity of trial and error approaches to the provision of effective sealing rings. The important clue in providing for this elimination is the realization and contribution effected by this invention that only a relatively small portion of the exterior face of the flange should be utilized as a sealing surface. With this realization the invention proves its uncontested ability to be versatile for highly variable conditions in sealing ring situations.

Thus, there has been disclosed a sealing ring which provides all of the objects and advantages above stated. Upon reading this application, however, one of ordinary skill in the art will become aware of other objects and advantages of this invention, along with modifications thereof, but it is to be realized that the foregoing is not to be considered limitative but only exemplary, the scope of the invention being defined by the appended claim.

What is claimed is:

A sealing ring for use with at least one annular part which has an internal, frusto-conically curved seat in a longitudinal bore thereof, adjacent and enlarging in diameter toward an end of the part, the seat being constructed and arranged at an acute angle of flaring with respect to the longitudinal axis of the part to sealingly receive said ring, the seat angle of flaring being in the range of about 15–20 degrees, said ring comprising:

an annulus of hard metal or the like having an annular cylindrical portion, and an annular, circumferential rib integrally extending radially outwardly from the radially outer extent of the cylindrical portion and at least one annular flange coaxially extending generally axially from one axial end of said cylindrical portion the flange being constructed and arranged so as to have a base integral with said cylindrical portion at said axial end;

said rib having a generally radially extending, axially facing surface constructed and arranged to contact a corresponding surface of said part to limit incursion of said ring annular flange into the bore of said part to thereby predetermine the extent and location of sealing engagement of the ring and the part when the ring and the part are drawn axially together into abutment;

said flange having adjacent and leading from the distal end thereof respecting said cylindrical portion, means defining a circumferentially extending, generally radially outwardly facing, frusto-conically curved annular sealing surface extending axially along the flange a distance in the range of about ⅛–½ the axial extent of the flange, increasing in diameter toward said cylindrical portion at an acute angle which is less than the angle of flaring of said seat, by at least one degree;

the flange sealing surface being of such large diameter at the distal end thereof that upon incursion of said flange into the bore of said part the flange sealing surface at said distal end engages said part sealing surface prior to the abutment of said axially facing surfaces;

the flange throughout the distance between said ring cylindrical portion and the proximal end of said flange sealing surface being relieved so as to extend substantially less in a radially outward direction than an imaginary frusto-conical continuation of said flange sealing surface toward said rib;

the flange including the sealing surface thereof being constructed and arranged to be deflected generally radially inwardly upon incursion of said ring into said bore until abutment of said axially facing surfaces by an amount, at the location of the initial average diameter of said ring sealing surface, which is no more than about the initial average diameter of the ring sealing surface multiplied by the yield strength of the ring material and divided by the modulus of elasticity thereof;

wherein the flange is constructed and arranged to be deflected generally radially inwardly upon incursion of said ring into said bore until abutment of said axially facing surfaces by an amount, at the location of the initial average diameter of said sealing ring surface, approximately equal to $$\frac{0.891 V_H (1-v^2)(A+T)\sqrt{AT+T^2}}{E T_2 C_3 [(1-v^2)]^{3/4}}$$

wherein $V_H$ is uniform radial shear at said average diameter in units of weight per unit length of circumference of said ring sealing surface at the location of said average diameter, in accordance with the relationship $$V_H = \frac{KW}{COSQ2}$$

wherein K is the required contact pressure of the sealing ring sealing surface against the seat surface in units of weight per unit area of the sealing ring sealing surface, W is the length the sealing ring sealing surface measured along the sealing surface and Q2 is the flaring angle of the seat on the part;

wherein V is Poisson's ratio for the ring material and is in the range 0.24–0.34;

wherein A is the initial internal diameter of the sealing ring cylindrical portion;

wherein T is the initial radial thickness of the sealing ring flange at the location of the initial average diameter thereof;

wherein E is Young's modulus for the material of the sealing ring and is in the range of $27$–$31 \times 10^6$ pounds per square inch;

wherein $C_3$ is an empirically derived geometrical factor, which is plotted versus λD to scale in FIGURE 3 of the drawings, λ being equal to $$\frac{6.73[(1-v^2)]^{3/4}}{T(A+T)\sqrt{AT+T^2}}$$

and D being the initial axial length of the ring flange.

References Cited

UNITED STATES PATENTS

| | | | |
|---|---|---|---|
| 2,211,983 | 8/1940 | Parris | 277—225 X |
| 2,766,829 | 10/1956 | Watts et al. | 285—367 X |
| 2,766,998 | 10/1956 | Watts et al. | 285—341 X |
| 2,766,999 | 10/1956 | Watts et al. | 285—367 X |
| 2,938,562 | 5/1960 | Watts et al. | 285 |

LAVERNE D. GEIGER, *Primary Examiner.*

E. V. BENHAM, *Examiner.*

J. S. MEDNICK, *Assistant Examiner.*